United States Patent
Takada et al.

(10) Patent No.: US 6,294,600 B1
(45) Date of Patent: Sep. 25, 2001

(54) RUBBER COMPOSITION AND POWER TRANSMISSION BELT INCORPORATING THE RUBBER COMPOSITION

(75) Inventors: Toshimichi Takada; Kazutoshi Ishida; Isao Yoshida, all of Hyogo-ken (JP)

(73) Assignee: Mitsuboshi Belting, Ltd., Nagata, Kobe (JP)

( * ) Notice: Subject to any disclaimer, the term of this patent is extended or adjusted under 35 U.S.C. 154(b) by 0 days.

(21) Appl. No.: 09/485,027
(22) PCT Filed: Jun. 3, 1999
(86) PCT No.: PCT/IB99/01177
  § 371 Date: Feb. 1, 2000
  § 102(e) Date: Feb. 1, 2000
(87) PCT Pub. No.: WO99/62996
  PCT Pub. Date: Dec. 9, 1999

(30) Foreign Application Priority Data

Jun. 3, 1998 (JP) ............. 10-153467
Feb. 12, 1999 (JP) ............. 11-035033

(51) Int. Cl.[7] .................................. C08K 5/34
(52) U.S. Cl. ........................................ 524/105
(58) Field of Search ............................ 524/105

(56) References Cited

U.S. PATENT DOCUMENTS

| | | |
|---|---|---|
| 3,641,215 | 2/1972 | Usamoto et al. . |
| 4,376,184 | 3/1983 | Itoh et al. . |
| 4,559,688 * | 12/1985 | Abuisa ............... 29/157.3 |
| 4,808,442 * | 2/1989 | Verlaan ............ 427/393.5 |
| 4,933,385 | 6/1990 | Yamamoto et al. . |
| 5,310,800 * | 5/1994 | Shimizu ................ 525/193 |
| 5,610,217 * | 3/1997 | Yarnell ................. 524/397 |
| 5,698,650 * | 12/1997 | Jourdain .............. 526/283 |
| 5,710,218 * | 1/1998 | Nakahama ........... 525/211 |

FOREIGN PATENT DOCUMENTS

| | | |
|---|---|---|
| 0142930 | 5/1985 | (EP) . |
| 0776938 | 6/1997 | (EP) . |

OTHER PUBLICATIONS

Galan icheva NN et al.: "Bismaleimide as a promoter of the adhesion of vulcanisates based on a SKEP ethylene–propylene copolymer and a SKEPT ethylene–propylene terpolymer to PETP". *International Polymer Science and Technology*, vol. 19, No. 10, 1972, pp. T1–T2.

\* cited by examiner

*Primary Examiner*—Paul R. Michl
(74) *Attorney, Agent, or Firm*—Wood, Phillips, VanSanten, Clark & Mortimer (57) ABSTRACT

A power transmission belt comprising:
  a body comprising rubber comprising an ethylene-α-olefin elastomer and N,N'-m-phenylene dimaleimide added in an amount of 0.2–10 parts by weight per 100 parts by weight of ethylene-α-olefin elastomer.

25 Claims, 3 Drawing Sheets

RUBBER COMPOSITION AND POWER TRANSMISSION BELT INCORPORATING THE RUBBER COMPOSITION

BACKGROUND OF THE INVENTION

1. Field of the Invention

This invention relates to power transmission belts and, more particularly, to a power transmission belt having a frictional drive surface. The invention is also directed to a rubber composition for use in such belts.

2. Background Art

The ongoing demand for energy conservation has led to the design of highly compact engine compartments on automobiles. High performance engines in these compartments tend to produce a significant amount of heat, thereby requiring the power transmission belts on these engines to operate in a high temperature environment.

Power transmission belts have conventionally been made with the primary rubber component being natural rubber, styrene-butadiene rubber, and chloroprene. However, these rubbers tend to crack prematurely in high temperature environments.

Research has been undertaken for ways to improve the heat resistance of chloroprene rubber. Advances have been made. However, insufficient improvements have been made to make chloroprene rubber functional, to the desired extent, in high temperature environments.

Research has been undertaken using chlorosulfonated polyethylene rubber, hydrogenated nitrile rubber, fluororubber, etc., which have the main chains highly or completely saturated so as to have good heat resistance. Of these rubbers, chlorosulfonated polyethylene is generally recognized as being favorably comparable to chloroprene rubber with respect to dynamic fatigue, wear resistance, and oil resistance. However, chlorosulfonated polyethylene is adversely affected by vulcanization, and particularly by an acid acceptor, with respect to water resistance. With chlorosulfonated polyethylene, acid acceptors are commonly oxides such as MgO, PbO, etc.

Acid acceptors from lead compounds such as PbO, $Pb_3O_4$, etc. account for better water resistance in belts. However, lead compounds are not desirable from the standpoint of pollution and hygiene. An acid acceptor of MgO generates $MgCl_2$ during the cross linking reaction in the belt, as a result of which there is a decline in water resistance, thereby making this acid acceptor generally unacceptable for belt production. On the other hand, a composition with good water resistance is obtainable with the use of an acid acceptor of an epoxy type, rather than the acid acceptors of metallic oxide. However, the epoxy-type acid acceptors cause the emission of a bad odor, which is undesirable.

While power transmission belts made from chlorosulfonated polyethylene may have a good running life and good heat resistance in a high temperature atmosphere compared to belts made from chloroprene rubber, belts with chlorosulfonated polyethylene may have an unacceptably short lifetime in environments in which they are operating at a temperature of less than −30° C.

Presumably, this is a result of the fact that chlorosulfonated polyethylene rubber results from chlorosulfonation of polyethylene, with there being a high cohesive energy of chlorine in the rubber at low temperatures. Thus, the rubber curing takes place at low temperatures, resulting in loss of rubber elasticity. This may result in premature fracture.

Recently, it has been proposed to use an ethylene-α-olefin elastomer reinforced with a metallic salt of an α-β- unsaturated organic acid in place of chloroprene rubber to form power transmission belts. Such a composition is disclosed in Japanese Examined Patent Publication No. 9-500930.

In contrast to chlorosulfonated polyethylene, ethylene-α-olefin elastomers such as ethylene-propylene rubber (EPR), ethylene-propylene-diene rubber (EPDM), etc., are excellent in heat resistance and temperature resistance and are relatively cheap. However, because these compositions do not have a good resistance to oil, they are not commonly used in an environment where oil staining is common. In a dry frictional driving environment, as with a V-ribbed belt, oil staining may make the belts slippery, thereby diminishing their powertransmission capabilities. The use of this type of composition in power transmission belts is disclosed in Japanese Unexamined Patent Publication No. 6-345948.

An ethylene-α-olefin elastomer, such as ethylene-propylene-diene rubber (EPDM), while excellent in heat resistance and temperature resistance, is generally inferior in wear resistance to chloroprene rubber. With this elastomer, dust worn from the belt may adhere to the belt surfaces. The accumulated dust, which is generated primarily through contact with cooperating pulleys during belt operation, may cause the production of unwanted noise in use.

With an ethylene-α-olefin elastomer obtainable through sulfur vulcanization, it may be difficult to obtain a sufficient degree of cross linking, which may result in significant wear on the belt in operation. This is particularly so with a V-ribbed belt in which wear dust accumulates between adjacent ribs and tends to promote tack wear of the belt. With an ethylene-α-olefin elastomer having a large number of double bonds in the molecules so as to increase the degree of cross linking, the problem of tack wear can be reduced to a certain extent, but at the expense of reducing heat resistance.

Ethylene-propylene rubber is generally poor in tear strength, with peroxide vulcanization even further reducing the belt strength so that there is a tendency of load carrying cords therein to separate from the belt during operation. Through sulfur vulcanization, it is difficult to obtain a sufficient degree of vulcanization, with the result being that the belt may wear excessively in use. This is particularly true of V-ribbed belts in which wear dust accumulates between ribs and causes tack wear and potentially significant noise generation. By increasing the degree of vulcanization using EPDM having a large number of double bonds in the molecules, tack wear can be improved, however again with loss of heat resistance.

Typically, with a belt made from chloroprene rubber, a covering canvas has been used that is treated with resorcin-formalin-latex (RFL) and further rubberized to improve moldability and adhesion to a cushion rubber layer. With power transmission effected using the backside of such a belt, the rubber adhesively attached to the covering canvas is prone to being tacky. This may result in excessive frictional wear between the canvas and a cooperating pulley.

SUMMARY OF THE INVENTION

The invention is directed to a power transmission belt having a body made from rubber including an ethylene-α-olefin elastomer and N,N'-m-phenylene dimaleimide added in an amount of 0.2–10 parts by weight per 100 parts by weight of ethylene-α-olefin elastomer.

The rubber may be vulcanizable with a peroxide.

The rubber may further include sulfur in an amount of 0.01–1.0 parts by weight per 100 parts by weight of ethylene-α-olefin elastomer.

The body may include a cushion rubber layer with load carrying cords embedded therein and a second rubber layer and at least the second rubber layer includes rubber including an ethylene-α-olefin elastomer and N,N'-m-phenylene dimaleimide added in an amount of 0.2–10 parts by weight per 100 parts by weight of ethylene-α-olefin elastomer.

The body may include at least one rib, with the rib being formed in the second rubber layer.

In one form, the body has a compression section and a tension section and the second layer defines at least a part of the compression section.

The power transmission belt may be a V-ribbed belt.

The power transmission belt may include a covering canvas layer on the body.

The covering canvas layer may be treated with resorcin-formalin-latex.

In one form, the cushion rubber layer includes a vulcanizate derivable by vulcanizing an ethylene-α-olefin elastomer with sulfur.

The invention is also directed to a rubber composition including an ethylene-α-olefin elastomer and N,N'-m-phenylene dimaleimide added in an amount of 0.2–10 parts by weight per 100 parts by weight of ethylene-α-olefin elastomer.

The rubber composition may be vulcanizable with a peroxide.

The rubber composition may further include sulfur in an amount of 0.01–1.0 parts by weight per 100 parts by weight of ethylene-α-olefin elastomer.

The invention is also directed to a power transmission belt having a body with a cushion rubber layer with load carrying cords embedded therein and a second rubber layer and a covering canvas layer applied to the body. The cushion rubber layer may be a vulcanizate derivable by vulcanizing an ethylene-α-olefin elastomer with sulfur. The second layer may be a vulcanizate derivable by vulcanizing an ethylene-α-olefin elastomer with an organic peroxide. The covering canvas layer may be treated with resorcin-formalin-latex.

The body may include one or a plurality of ribs.

DETAILED DESCRIPTION OF THE DRAWINGS

Figure 1:
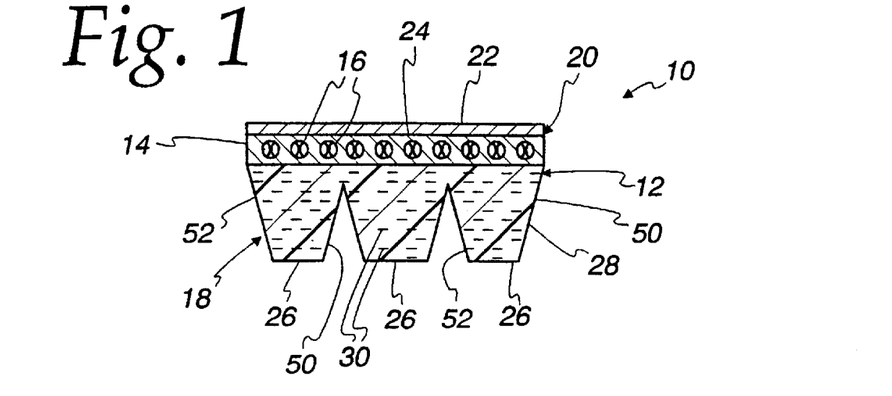
FIG. 1 is a cross-sectional view of a V-ribbed belt, according to the present invention.

A V-ribbed belt, according to the present invention, is shown at 10 in FIG. 1. The belt 10 has a body 12 with a cushion rubber layer 14 in which longitudinally extending, load carrying cords 16 are embedded. The belt 10 has a compression section 18 inside of the load carrying cords 16 and a tension section 20 outside of the load carrying cords 16. A covering canvas layer 22 is applied over the outside surface 24 of the body 12. A plurality of, and in this case three, ribs 26 are formed in a rubber layer 28 attached to the inside of the cushion rubber layer 14 in the compression section 18. The ribs 26 extend lengthwise with respect to the belt 10.

The load carrying cords 16 are formed to be strong and relatively inextensible. Suitable materials for making the load carrying cords 16 are polyester fiber, aramid fiber, and glass fiber.

The rubber layer 28 is an elastomer that may have short, reinforcing fibers 30 embedded therein and extending laterally with respect to the belt body 12.

Figure 2:
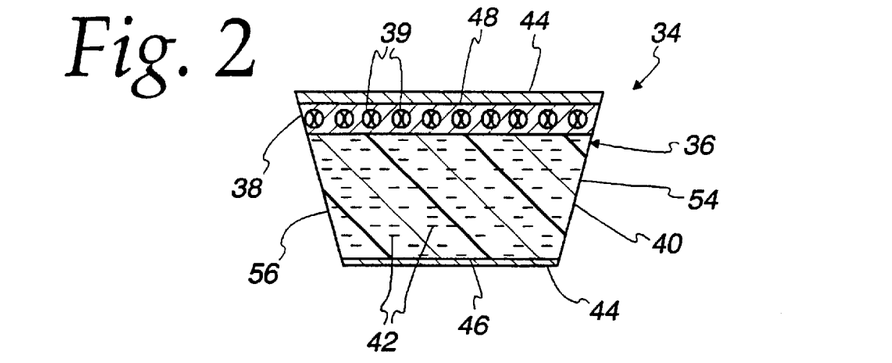
FIG. 2 is a cross-sectional view of a V-belt, according to the present invention.
Figure 3:
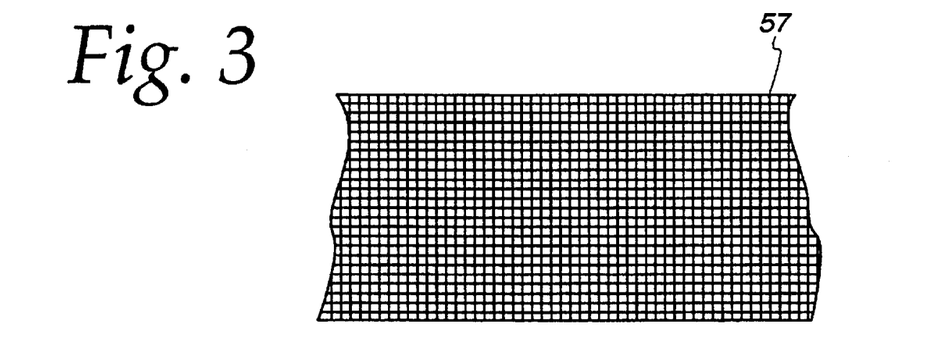
FIG. 3 is a fragmentary, plan view of a covering canvas layer, as shown on the belts in FIGS. 1 and 2.
Figure 4:
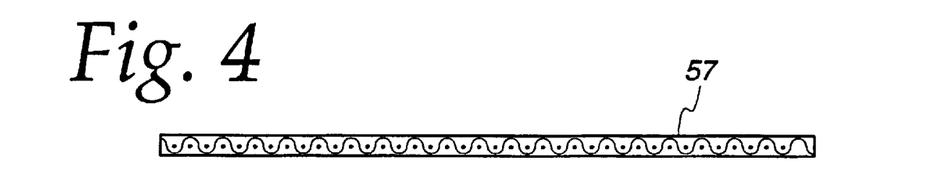
FIG. 4 is a fragmentary, elevation view showing the thickness of the covering canvas layer of FIG. 3.
Figure 5:
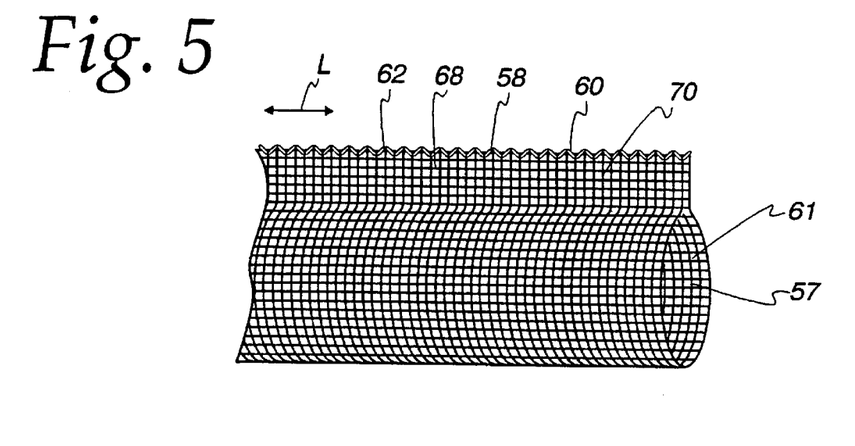
FIG. 5 is a perspective view of the covering canvas layer FIGS. 3 and 4 formed into a cylindrical sleeve.

Another form of belt, made according to the present invention, is shown at 34 in FIG. 2. The belt 34 is a V-belt with a body 36 having a cushion rubber layer 38 with load carrying cords 39 embedded therein. A rubber layer 40 is provided inside of the cushion rubber layer 38 and has short reinforcing fibers 42 embedded therein. Covering canvas layers 44 are provided on the inside surface 46 and outside surface 48 of the body 36.

Suitable ethylene-α-olefin elastomers, usable in the layers 28, 40, are ethylene-propylene rubber (EPR) and ethylene-propylene-diene monomer (EPDM). A suitable diene monomer may be selected from dicyclopentadiene, methylene norbornene, ethylidene norbornene, 1,4-hexadiene, cyclooctadiene, etc.

The rubber layers 28, 40 may be made using an organic peroxide as a vulcanizing agent for the ethylene-α-olefin elastomer. A co-vulcanizing agent (co-agent) is added which may include TIAC, TAC, 1,2-polybutadiene, metallic salts of unsaturated carboxylic acid, oxims, guanidine, trimetylolpropane trimethacrylate, ethylene glycol dimethacrylate, N,N'-m-phenylene bismaleimide, etc., commonly used for peroxide vulcanization.

Of the above, N,N'-m-phenylene dimaleimide is preferred to increase the degree of vulcanization, preclude tack wear, and address other problems. The amount of N,N'-m-phenylene dimaleimide is in the range of 0.2–10 parts by weight per 100 parts by weight of the ethylene-α-olefin elastomer.

Less than 0.2 parts by weight may result in diminished crosslink density as a result of which wear resistance and tack wear resistance may be inadequate.

More than 10 parts by weight may make the finished vulcanized rubber less stretchable, adversely affecting flex resistance.

Sulfur is added to the rubber layers 28, 40 in an amount of 0.1–1 part by weight per 100 parts by weight of the ethylene-α-olefin elastomer so as to prevent a loss of stretchability.

More than one part by weight may not improve the degree of cross linking, wear resistance, or tack wear resistance, as desired.

The organic peroxide may be chosen from among those commonly used for vulcanization of rubbers and resins. Exemplary are diacyl peroxide, peroxy ester, dially peroxide, di-t-butyl peroxide, t-butylcumyl peroxide, dicumyl peroxide, 2.5-dimethyl-2.5-di(t-butylperoxy) hexane-3, 1.3bis(t-butylperoxy isopropyl)-benzene, 1.1-dibutylperoxy-3,3,5-trimethyl cyclohexane, etc. It is preferred that the organic peroxide have a half life at 150–250° C. of one minute after thermal decomposition.

The amount of peroxide to be used is in the range of approximately 1–8 parts by weight, and more preferably 1.5–4 parts by weight, per 100 parts by weight of the ethylene-α-olefin elastomer.

The reinforcing fibers 30, 42 are preferably short fibers of nylon 6, nylon 66, polyester, cotton, aramid, or the like. The fibers 30, 42 improve the resistance of the rubber layers 28, 40 to lateral pressure application. By grinding the sides 50, 52 on the ribs 26 on the belt body 12 and sides 54, 56 on the belt body 36, the fibers 30, 42 can be caused to protrude therefrom. This reduces the coefficient of friction between the sides 50, 52, 54, 56 and a cooperating pulley, as a result of which noise may be lessened during belt operation. Of the above fibers, aramid fibers are preferred because of the rigidity, strength and wear resistance thereof.

To realize the above benefits, the length of the fibers 30, 42 is preferably in the range of 1–20 mm. The amount of fibers 30, 42 used is preferably in the range of 1–30 parts by weight per 100 parts by weight of the ethylene-α-olefin elastomer. Suitable aramid fibers include those having an aromatic ring in their molecular structure. Exemplary, suitable, aramid fibers are sold commercially under the trademarks CORNEX™, NOMEX™, KEVLAR™, TECHNORA™, TWARON™, and the like.

The rubber layers 28, 40 may include a fine, short, fiber-reinforced rubber, with the amount of reinforcing fibers being 1–50 parts by weight, and more preferably 5–25 parts by weight, per 100 parts by weight of the matrix rubber, i.e. ethylene-α-olefin elastomer. The reinforced rubber is formed by grafting an ethylene-α-olefin elastomer with fine, short, fiber having a diameter of 1.0 $\mu$m or less, and preferably a diameter of 0.05 to 0.08 $\mu$m.

Less than one part by weight of the fine, short, fiber-reinforced rubber may be insufficient to provide adequate wear resistance. More than 50 parts by weight may reduce stretchability of the rubber composition and may diminish heat and flex resistance.

The ethylene-α-olefin elastomer used in the fine, short, fiber-reinforced rubber may be identical to the ethylene-α-olefin elastomer added as the matrix rubber in the layers 28, 40. Thus, the aforementioned elastomer is effectively adhered to the matrix rubber. The fine, short, fiber-reinforced rubber is chemically bonded to the matrix rubber, with the ethylene-α-olefin elastomer chemically bonded to the fine, short, fiber in the fine, short, fiber-reinforced rubber so that the layers 28, 40 are not susceptible to cracking. Once cracked, the layers 28, 40 resist crack propagation.

In the fine, short, fiber-reinforced rubber described above, the fine, short, fiber and the ethylene-α-olefin elastomer are grafted on their interfacial surfaces by the use of a coupling agent. The coupling agent may be, for example, a silane coupling agent such as vinyl tris(β-methoxyethoxy)silane, vinyl triethoxysilane, γ-methacryloxypropyl trimethoxysilane, or the like, a titanate coupling agent such as isopropyltriisostearoyl titanate, or the like, an unsaturated carboxylic acid such as acrylic acid, methacrylic acid, maleic acid, or the like, or an adhesive such as novolak phenol resin, or the like. Grafting is attained by kneading and extruding the ethylene-α-olefin elastomer in the fine, short, fiber together with a bonding agent such as a coupling agent, or the like, at a temperature higher than the temperature at which the short fiber is melted.

In the fine, short, fiber-reinforced rubber, the rubber component serves as a continuous phase, with the short fiber dispersed in a fine state in that phase so that the fine, short, fiber is firmly, chemically bonded to or mutually active with the rubber component on an interface between the rubber component and the short fiber. Thus, the reinforced, rubber-containing rubber layer is less susceptible to cracking and resists crack propagation, once cracking occurs. Further, a belt made from such a rubber layer may have excellent resistance to heat and temperature variation, and good flex and wear characteristics.

Optionally, the layers 28, 40 may contain additives such as one or more chosen from reinforcing agents such as carbon black, silica, etc., fillers such as clay, calcium carbonate, etc., softeners, processing aids, antioxidants, and co-agents such as TAIC, etc.

In the layers 28, 40, nitrile rubber, hydrogenated nitrile rubber, rubber derived by adding a metallic salt of an unsaturated carboyxlic acid to hydrogenated nitrile rubber, chlorosulfonated polyethylene, chloroprene, urethane rubber, epichlorohydrin rubber, natural rubber, chlorosulfonated polyethylene rubber (CSM), alkylated chlorosulfonated polyethylene (ACSM), styrene-butadiene rubber (SBR), or the like, may be used in combination with the ethylene-α-olefin elastomer.

Use of hydrogenated nitrile rubber, with a hydrogenation ratio of 80% or more, and more preferably 90% or more, results in acceptable heat and ozone resistance.

A hydrogenation ratio of less than 80% may result in significant decline in heat and ozone resistance. In terms of oil resistance and temperature resistance, it is desired that the amount of bound acrylonitrile be set in the range of 20–45%.

Chlorosulfonated polyethylene is a straight chain, low density polyethylene chlorosulfonated to have a chlorine content of 15–35% by weight, and more preferably 25–32% by weight, with a sulfur content in the range of 0.5–2.5% by weight.

The same ethylene-α-olefin elastomer composition, described for the layers 28, 40, may be used for the cushion rubber layers 14, 38. To obtain good adhesion to polyester fiber, aramid fiber, glass fiber, etc., as used in the load carrying cords 16, 39, an ethylene-α-olefin elastomer composition adapted for sulfur vulcanization with a peroxide omitted, a chlorosulfonated polyethylene composition, or a hydrogenated nitrile rubber composition, can be used.

The load carrying cords 16, 39 can be made from a rope made from polyethylene terephthalate fiber, polyester fiber having a recurring main unit of ethylene-2,6-naphthalate, or polyamide fiber which is adhesive treated to improve bonding to rubber. A treatment may be carried out by dipping the fibers in resorcin-formalin-latex (RFL solution) and subsequently by drying the dipped fibers in a heated environment to produce a uniform adhesive layer on the fibers.

Optionally, the fibers may be pre-treated with an epoxy or isocyanate compound followed by treatment with an RFL solution.

Ethylene-2-6-naphthalate, as used in the present invention, can be synthesized by polycondensing naphthalene-2,6-dicarboxylic acid or an ester-forming derivative thereof with ethylene glycol in the presence of a catalyst and under appropriate reaction conditions. A polyester copolymer may be obtained by the addition of one or more suitable third components before the polycondensation of ethylene-2,6-naphthalate is completed.

The adhesive treatment of the load carrying cords 16, 39 is effected by: 1) immersing and pre-dipping an untreated cord in a tank having one of an epoxy compound and an isocyanate compound; 2) drying the pre-dipped cord while passing the same through a drying furnace maintained at 160–200° C. for 30–600 seconds; 3) dipping the dried cord in a tank having a bonding solution or RFL solution; and 4) stretching the cord thus treated to 1–3% while it is being passed through a stretching type heat setting device maintained at 210–260° C. for 30–600 seconds.

The RFL solution is one derivable by mixing a precondensate of resorcin and formalin with latex. In a preferred form, the latex is selected from chloroprene, styrene-butadiene-vinyl pyridine terpolymer, hydrogenated nitrile, NBR, etc.

The rubber composition used in the layers 28, 40 may contain additives such as carbon black, plasticizers, antioxidants and processing aids. The rubber compositions with these additives can be kneaded through the use of a Banbury mixer, a kneader, or the like, in conventional manner.

The cover canvas layers 22, 44 may be cloth made by plain weaving, twill weaving, satin weaving, or the like, using threads formed from cotton, polyamide fiber, polyethylene terephthalate fiber, or aramid fiber.

The thickness of the canvas cloth is then rigidified by a bonding treatment with RFL so that a cylindrical sleeve made from the canvas is prevented from creasing during a spinning stage.

RFL treatment is effected by dipping the cloth in an RFL solution for 0.1–20 seconds and thereafter effecting drying at 100–200° C. for 30–600 seconds. The RFL solution is a precondensate of resorcin and formalin mixed with a rubber latex. In this embodiment, the mol ratio of resorcin to formalin is 1:0.5–3 to thereby increase adhesive strength. The precondensate of resorcin and formalin is mixed in an amount of 10–100 parts by weight, as determined by the resin content, per 100 parts by weight of the rubber content in the latex. The total solid content is controlled to be 5–40%.

The RFL solution may contain carbon black in order to dye the cloth a black color. In the case of cotton cloth, an RFL solution can preferably be incorporated with a surfactant in an amount of 0.1–1.0% by weight.

The latex may be chosen from styrene-butadiene-vinyl pyridine terpolymer, chlorosulfonated polyethylene, hydrogenated nitrile rubber, epichlorohydrin, natural rubber, SBR, chloroprene rubber, olefin-vinyl ester copolymer, etc.

Referring to FIGS. 3–7, a canvas cloth 57 used to form the canvas layer 22, 24 is formed by butting edges 58, 60 to produce a cylindrical sleeve 61. A seam 62 is formed at the juncture of the edges 50, 60, by sewing, as by overlocking using a monofilament or multifilament thread that may be cotton, nylon, vinylon, polyester or the like. The seam is formed along the lengthwise direction of the sleeve 61, as indicated by the double-headed arrow L.

Figure 6:
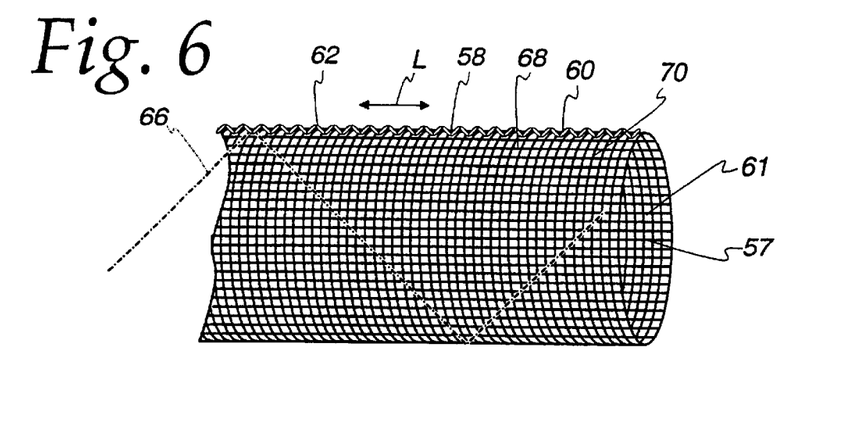
FIG. 6 is a perspective view of the cylindrical sleeve in FIG. 5 showing a cutting pattern to produce a cut sheet.
Figure 7:
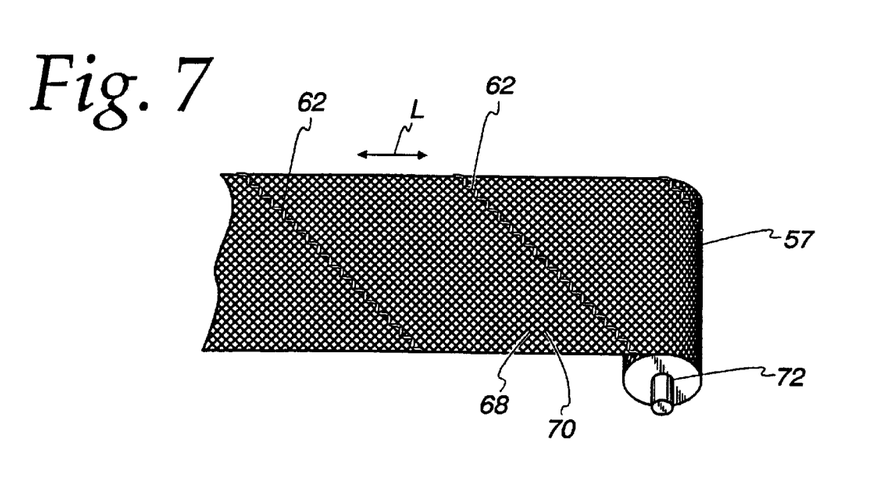
FIG. 7 is a perspective view of the cut sheet in FIG. 6 formed into a roll.

The resulting cylindrical sleeve 61 is spirally cut at 45° relative to the line L along a line, indicated at 66, to produce a cut sheet. The resulting cut sheet has warp yarns 68 and weft yarns 70 aligned at equal angles with respect to the line L. The warp yarns 68 and weft yarns 70 cross each other at a 90° angle. The warp yarns 68, weft yarns 70, and seam 62 all make an angle of 45° with the line L. The resulting cut canvas sheet is then wrapped around a reel 72.

Figure 8:
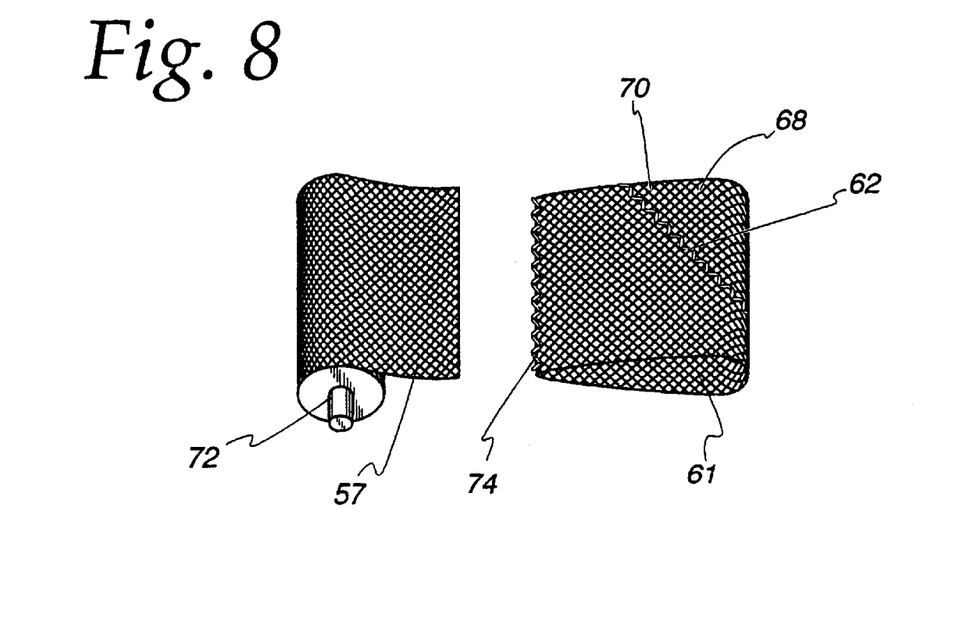
FIG. 8 is a perspective view of the cut canvas from FIG. 7 formed into a cylindrical sleeve.

In FIG. 8, a process used to form a cylindrical sleeve from the cut canvas is shown in which the warp yarns 68 and weft yarn 70 intersect at 90°. The canvas is cut in lengths and joined together at cut edge portions so that the resulting belt sleeve 61 has a normal joint line 74 and a bias joint line, i.e. the seam 62.

Figure 9:
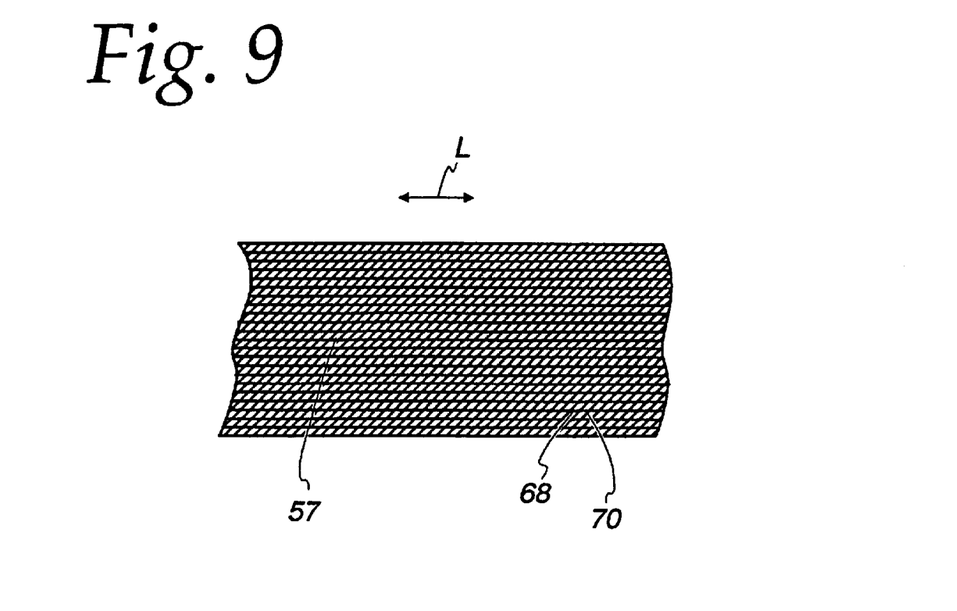
FIG. 9 is a fragmentary, plan view of a covering canvas layer having warp and weft yarns oriented differently from warp and weft yarns in the covering canvas layer of FIG. 3.

In FIG. 9, a side angle canvas cloth 57 is shown having warp yarns 68 and weft yarns 70 intersected at 120° with respect to each other. The warp yarns 68 are parallel to the line L. The warp yarns 68 and weft yarns 70 are caused to be forcibly placed at the large angle by tentering.

The canvas cloth 57 in FIG. 9 can be formed into a covering canvas layer by the method shown in FIGS. 5–8. In this case, the cut canvas is butt joined by sewing to prepare a cylindrical canvas sleeve which is then cut spirally at 60° in a lengthwise direction. This produces a construction wherein the warp yarns 68 and weft yarns 70 are angled equally in relationship to each other. The resulting canvas is cut in lengths and joined at its cut edge portions.

One method of producing the belt 10 will now be described. One or more covering canvas layers 22 are initially wrapped around a cylindrical molding drum. The cushion rubber layer 14 is applied over the canvas layer(s) 22. The load carrying cords 16 are then spirally wrapped around the cushion rubber layer 14. The rubber layer 28 is then applied. The resulting subassembly is then vulcanized in sleeve form.

The vulcanized sleeve is then trained around spaced driving and driven rolls and moved in an endless path therearound under a predetermined tension. A rotating grinding wheel is then brought into contact with the vulcanized belt sleeve to grind therein a plurality of ribs in the rubber layer 28. For example, 3–100 ribs may be ground simultaneously in the vulcanized sleeve. The vulcanized sleeve is then removed from the driving and driven rollers and trained around a separate set of driving and driven rollers. The vulcanized sleeve is then cut to a width corresponding to the desired finished belt.

The inventive rubber composition potentially allows a belt to be constructed therefrom having a good running life, in both high temperature and low temperature environments, and good wear characteristics. A belt made according to the invention may be operated, through backside driving, without excessive noise generation due to tackiness.

The performance of the inventive belts will now be described through the results of comparative testing of various inventive belt examples and other types of belts.

INVENTIVE EXAMPLES 1–3 AND COMPARATIVE EXAMPLES 1–3

A V-ribbed belt for each of the examples was constructed with a cushion rubber layer having a load carrying cord embedded therein. The load carrying cord was formed from a polyester fiber rope. A single ply of a cotton canvas layer was laminated on the outer surface of the cushion rubber layer. The canvas was treated with only an RFL solution (100 parts by weight of styrene-butadiene-vinyl pyridine terpolymer; 14.6 parts by weight of resorcin, 9.2 parts by weight of formalin, 1.5 parts by weight of sodium hydroxide, and 262.5 parts by weight of water). A rubber layer, defining part of the compression section, had three ribs defined therein and extending lengthwise of the belt. The resulting V-ribbed belt was a 975 mm long K-type, three-ribbed belt, per RMA standards, with a rib pitch of 3.56 mm, a rib height of 2.9 mm, a belt thickness of 5.3 mm, and a rib angle of 40°.

The cushion rubber layers and the rubber layers defining part of the compression sections (hereinafter the compression rubber layer) were made from the rubber compositions shown in Table 1, below.

TABLE 1

| Formulation No. | Compression rubber layer | | | Cushion rubber layer | | |
| --- | --- | --- | --- | --- | --- | --- |
| | R1 | R2 | R3 | C1 | C2 | C3 |
| EPDM resin Mitsui 4045 | 100 | 100 | 100 | 100 | 100 | 100 |
| Nylon cut yarn | 10 | 10 | 10 | — | — | — |
| Aramid cut yarn | 10 | 10 | 10 | — | — | — |
| Stearic acid | 1.5 | 1.5 | 1.5 | 0.5 | 0.5 | 0.5 |
| Zinc oxide | 5 | 5 | 5 | 5 | 5 | 5 |
| HAF carbon black | 55 | 55 | 55 | 40 | 40 | 40 |
| Paraffinic oil | 15 | 15 | 15 | 15 | 15 | 15 |
| Hydrous silica | — | — | — | 15 | 15 | 15 |
| Vulcanization accelerator (1) | — | — | 1 | — | 1 | — |
| Vulcanization accelerator (2) | — | — | 0.5 | — | 0.5 | 0.6 |
| Vulcanization accelerator (3) | — | — | 1 | — | 1 | — |
| Vulcanization accelerator (4) | — | — | — | — | — | 0.5 |
| Vulcanization accelerator (5) | — | — | — | — | — | 2 |
| Sulfur | — | — | 1 | — | 1 | 0.8 |
| Peroxide (6) | 8 | — | — | — | — | — |
| Peroxide (7) | — | 2 | — | — | — | — |
| Co-vulcanizing agent (8) | 2 | 2 | — | — | — | — |

(1) Tetramethylthiuram disulfide (TMTD)
(2) Dipentamethylenethiuram tetrasulfide (DPTT)
(3) N-Cyclohexyl-2-benzothiazyl-sulfenamide
(4) Tetra methylthiuram monosulfide
(5) Tellurium diethyldithiocarbamate
(6) Dicumyl Peroxide (40%)
(7) 1.3-bis-(t-butyl peroxy isopropyl)benzen(>98%)
(8) N,N'-m-phenylene dimaleimide The compositions were kneaded with a Banbury mixer and calendered with a calendering roll. In the compression rubber layers, short fibers were incorporated and extended widthwise of the belt.

The covering canvas used in Comparative Example 3 was prepared by treating the canvas with the above RFL solution, by dipping the treated canvas in a rubber paste prepared from dilution of a C1-formulated rubber in toluene to a concentration of 10%, by squeezing the dipped canvas, and by then drying the canvas in an oven at 80° C. The coverage of rubber was controlled to 30 g/m².

After the belt components were formed around a smooth cylindrical mold, a vulcanizing jacket was placed around the sleeve subassembly and the sleeve subassembly vulcanized. The vulcanized sleeve, having a cylindrical shape, was taken out of the mold. The compression rubber layer of the sleeve was ground to form ribs, with the sleeve then cut to form individual belts.

The resulting V-ribbed belts were tested and evaluated in terms of 1) peel strength between the cushion rubber layer and the load carrying cords, 2) heat resistance in operation, 3) tack wear of the ribs with the belt operating at room temperature, and 4) backside tack. The results obtained are shown in Tables 2 and 3, below.

TABLE 2

| | Inventive Example 1 | Inventive Example 2 | Inventive Example 3 | Comparative Example 1 | Comparative Example 2 |
| --- | --- | --- | --- | --- | --- |
| Cushion rubber layer | C2 sulfur | C3 sulfur | C2 sulfur | C1 peroxide | C2 sulfur |
| Compression rubber layer | R1 peroxide | R1 peroxide | R2 peroxide | R2 peroxide | R3 sulfur |
| Ambient temperature (° C.) | 23   120 | 23   120 | 23   120 | 23   120 | 23   120 |
| Adhesion strength[N] (peel strength of two load carrying cords) | 46.5   13.8 | 41.9   12.4 | 41.7   12.9 | 20.4   4.5 | 55.2   15.8 |

TABLE 3

| | Inventive Example 1 | Inventive Example 2 | Inventive Example 3 | Comparative Example 1 | Comparative Example 2 | Comparative Example 3 |
| --- | --- | --- | --- | --- | --- | --- |
| Cushion rubber layer | C2 sulfur | C3 sulfur | C2 sulfur | C1 peroxide | C2 sulfur | C2 sulfur |
| Compression rubber layer | R1 peroxide | R1 peroxide | R2 peroxide | R1 peroxide | R3 sulfur | R1 peroxide |
| Covering canvas | RFL treatment only | ← | ← | ← | ← | RFL treatment Rubber paste |
| Presence or absence of popout on lapse of 100 hrs of operation | absence | absence | absence | Pop-out after lapse of 24 hrs 40 mm found | absence | absence |
| Presence or absence of tack wear at ribbed portion | absence | absence | absence | absence | presence | absence |
| Presence or absence of tack wear on belt backside | absence | absence | absence | absence | absence | presence |

Peel Strength

The peel strength test was conducted by peeling two load carrying cords of the above V-ribbed belts at a speed of 50 mm/min at two different atmospheric temperatures (23° C. and 120° C.) with the use of Strograph T.

Heat Resistance of Operating Belt

The testing machine used to evaluate heat resistance had a 120 mm diameter driving pulley and a 120 mm diameter driven pulley. A 70 mm diameter idler pulley and 45 mm diameter tensioning pulley were used. With the belt interengaged with the pulleys, the system was operated at an atmospheric temperature of 120° C. at 4900 rpm for the driving pulley. A 12 horsepower load was applied to the driven pulley with an initial tension of 57 kgf applied to the tensioning pulley.

The idler pulley was engaged with the belt on a backside thereof to produce a winding angle of approximately 90°. In this test, the operating time was measured at which cracking occurred at a rib portion of the belt.

Tack Wear Test

To evaluate the presence or absence of tack wear of the ribs, the belts were operated at room temperature on a testing machine having a 120 mm diameter driving pulley, a 120 mm diameter driven pulley, and a 45 mm diameter tensioning pulley. A load of 12 horsepower was applied to the driven pulley, with the driving pulley operated at 4900 rpm. An initial tension of 85 kgf was applied to the tensioning pulley.

Backside Tack

To evaluate the presence or absence of backside tack, a testing machine was used having a 70 mm diameter driving pulley, and a 120 mm diameter driven pulley. An 11.2 horsepower load was applied to the driven pulley with a dead weight of 120 kgf loaded to impart tension. The driving pulley was operated at 700–2000 rpm at intervals of 15±5 seconds. The driving and driven pulleys had crowns defined on their surfaces, with the backsides of the belts situated to contact the pulleys.

As can be seen from the results in Tables 2 and 3, the inventive belts having ribs formed from a rubber composition of organic peroxide-vulcanizable ethylene-propylene rubber, and a cushion rubber layer formed from a rubber composition of sulfur-vulcanizable ethylene-propylene rubber had a) improved adhesion of the load carrying cords to In the Comparative Example 10, the load carrying cord was formed from a polyester fiber rope embedded in a cushion rubber layer, with a single ply of cotton canvas laminated on the outer surface of the cushion rubber layer. The canvas used was obtained by treating in the above RFL solution by: a) dipping the treated canvas in a solution prepared from diluting a rubber formulation for use in the cushion rubber layer in toluene to a solid content of 10%; b) drying the dipped canvas in an oven at 80° C.; and c) controlling the dried canvas to have a rubber coverage of 30% by weight. The compression rubber layer had the same composition as for Inventive Example 4.

The compression rubber layers were prepared from the rubber composition shown in Table 4, below.

TABLE 4

|  | Inventive Examples | | | Comparative Examples | | | | | | |
| --- | --- | --- | --- | --- | --- | --- | --- | --- | --- | --- |
|  | 4 | 5 | 6 | 4 | 5 | 6 | 7 | 8 | 9 | 10 |
| Formulation of compression rubber layer | | | | | | | | | | |
| EPDM | 100 | 100 | 100 | 100 | 100 | 100 | 100 | 100 | 100 | 100 |
| Nylon cut yarn | 15 | 15 | 15 | 15 | 15 | 15 | 15 | 15 | 15 | 15 |
| Aramid cut yarn | 5 | 5 | 5 | 5 | 5 | 5 | 5 | 5 | 5 | 5 |
| Stearic acid | 1 | 1 | 1 | 1 | 1 | 1 | 1 | 1 | 1 | 1 |
| Zinc oxide | 5 | 5 | 5 | 5 | 5 | 5 | 5 | 5 | 5 | 5 |
| HAF carbon black | 50 | 50 | 50 | 50 | 50 | 50 | 50 | 50 | 50 | 50 |
| Paraffinic oil | 10 | 10 | 10 | 10 | 10 | 10 | 10 | 10 | 10 | 10 |
| Antioxidant | 2 | 2 | 2 | 2 | 2 | 2 | 2 | 2 | 2 | 2 |
| N,N'-m-phenylene dimaleimide | 2 | 6 | 10 | 0 | 0 | 0 | 0 | 15 | 2 | 2 |
| Triallyl isocyanurate | 0 | 0 | 0 | 0 | 2 | 0 | 0 | 0 | 0 | 0 |
| Trimethylolpropane trimethacrylate | 0 | 0 | 0 | 0 | 0 | 2 | 0 | 0 | 0 | 0 |
| Peroxide (DPC40) | 8 | 8 | 8 | 8 | 8 | 8 | 0 | 0 | 8 | 8 |
| Sulfur | 0.2 | 0.6 | 1 | 0 | 0 | 0.2 | 1.5 | 0 | 1.5 | 0.2 |
| Vulcanization accelerator (MBT) | 0 | 0 | 0 | 0 | 0 | 0 | 1 | 0 | 0 | 0 |
| Vulcanization accelerator (TMTD) | 0 | 0 | 0 | 0 | 0 | 0 | 1.5 | 0 | 0 | 0 |
| Canvas treatment | | | | RFL solution only | | | | | | *1) |
| Presence or absence of tack wear at ribbed portion | absence | absence | absence | presence | presence | presence | presence | absence | presence | absence |
| Presence or absence of tack on belt backside | absence | absence | absence | absence | absence | absence | absence | absence | absence | presence |
| Heat-resistant operating lifetime | 332 | 267 | 172 | — | — | — | — | 73 | — | — |
| Temperature-resistant operating lifetime | 239 | 195 | 148 | — | — | — | — | 19 | — | — | the cushion rubber layers, b) better lifetime in a high temperature environment, c) better resistance to tack wear at the rib portions, and d) reduced backside tack compared to the comparative examples.

INVENTIVE EXAMPLES 4–7 AND COMPARATIVE EXAMPLES 4–10

As with the inventive examples 1–3, V-ribbed belts were produced with a cushion rubber layer having a load carrying cord embedded therein. The load carrying cord was made from a polyester fiber rope. A single ply of a cotton canvas cloth was laminated on one outer surface of the cushion rubber layer. The canvas was treated only with an RFL solution (100 parts by weight of styrene-butadiene-vinyl pyridine terpolymer, 14.6 parts by weight of resorcin, 9.2 parts by weight of formalin, 1.5 parts by weight of sodium hydroxide, and 262.5 parts by weight of water).

The compression rubber layer had three ribs defined therein extending lengthwise of the belt. The resulting V-ribbed belt was a 975 mm long, K-type, three-ribbed belt, per RMA standards, with a rib pitch of 3.56 mm, a rib height of 2.9 mm, a belt thickness of 5.3 mm, and a rib angle of 40°.

The compositions were kneaded in a Banbury mixer and calendered with a calendering roll. In the compression rubber layer, short fibers were embedded and oriented in a lateral direction.

To form the cushion rubber layer, the rubber compositions of Table 5 were used.

TABLE 5

| Formation of cushion rubber layer | Parts by weight |
| --- | --- |
| EPDM | 100 |
| Stearic acid | 0.5 |
| Zinc oxide | 5 |
| HAF carbon black | 40 |
| Paraffinic oil | 15 |
| Hydrous silica | 15 |
| Vulcanization accelerator (TMTD) | 1 |
| Vulcanization accelerator (DPTT) | 0.5 |
| Vulcanization accelerator (CBS) | 1 |
| Sulfur | 1 |

With the resulting belts, tack wear tests at the rib portions and on the belt backsides were conducted using the above methods.

Heat resistance and temperature resistance during operation were tested as follows, with the results set out in Table 4.

Heat Resistance Test

A testing machine was used to evaluate heat resistance during operation and had a 120 mm diameter driving pulley and a 120 diameter driven pulley. A 45 mm diameter idler pulley and 70 mm diameter tensioning pulley were used. The belts were interengaged with the pulleys and operated in an atmosphere at 120° C. The driving pulley was rotated at 4900 rpm. A 12 horsepower load was applied to the driven pulley, with an initial tension of 57 kgf applied to the tensioning pulley. The idler pulley was engaged with the belt on a backside thereof to produce a winding angle of approximately 120°. The time was measured at which cracking occurred at the rib portions of the belt.

Temperature Resistance Test

The belts were engaged with a 140 mm diameter driving pulley and a 45 mm diameter driven pulley. A 75 mm diameter backside idler pulley was used. The belts were allowed to stand for 18 hours at an atmospheric temperature of −40° C. The driven pulley was operated at 700 rpm with an 85 kgf load applied. The belts were operated for one minute and stopped for two minutes. This cycle was repeated until cracking occurred, with the appropriate data noted.

As can be seen with the test results in Table 4, the inventive belts with ribs formed from a rubber composition of ethylene-propylene rubber, and a covering canvas treated with only RFL and disposed on a backside of the belt, had less tack wear at the rib portions and on the covering canvas compared to conventional belts. The inventive belts were also improved in terms of lifetime in both high temperature and low temperature environments and showed excellent heat resistance and temperature resistance compared to a chloroprene rubber belt.

COMPARATIVE EXAMPLE 11

A compression rubber layer was prepared from a CR rubber formulation as shown in Table 6, below.

TABLE 6

| Formulation of compression rubber layer | Comparative Example 11 |
|---|---|
| Chloroprene | 100 |
| Nylon cut yarn | 15 |
| Carbon black | 40 |
| Plasticizer (DOP) | 10 |
| Stearic acid | 1 |
| Octylated diphenylamine | 2 |
| Magnesium oxide | 4 |
| Zinc oxide | 5 |
| Vulcanization accelerator (ETU) | 0.5 |
| Presence or absence of tack wear at ribbed portion and on belt backside | Absence |
| Heat-resistant operating lifetime (hrs) | 70 |
| Temperature-resistant operating lifetime (hrs) | Within 1 |

The rubber was kneaded with a Banbury mixer and calendered with a calendering roll. Short reinforcing fibers were embedded in the compression rubber layer. A cushion rubber layer was formed from the same formulation as used for the compression rubber layer but had no short nylon or aramid fibers therein.

A covering canvas layer was made by treating a cotton canvas cloth with only an RFL solution (100 parts by weight of styrene-butadiene-vinyl pyridine terpolymer, 14.6 parts by weight of resorcin, 9.2 parts by weight of formalin, 1.5 parts by weight of sodium hydroxide, and 262.5 parts by weight of water). The treated canvas was dipped in a solution prepared by diluting a CR rubber formulation of Table 3 in toluene to a concentration of 10%. The dipped canvas was dried in an oven at 80° C. The coverage of the rubber was controlled to be 30% by weight.

With the above materials, V-ribbed belts were produced in the same manner as for the inventive examples. Testing was done for tack wear at the rib portions and at the backsides of the belt as well as for heat resistance and temperature resistance with the belts in operation. The results are shown in Table 6.

Though free of tack wear, the belt with the CR rubber formulation was inferior in heat resistance and temperature resistance to the belts of the present invention.

INVENTIVE EXAMPLES 8–15 AND
COMPARATIVE EXAMPLES 11–16

The V-ribbed belt in each of the above examples was constructed with a cushion rubber layer, a load carrying cord formed of a polyester fiber rope and embedded in the cushion rubber layer, a two-ply rubberized canvas laminated on the cushion rubber layer, and a compression rubber layer positioned between the cushion rubber layer and having three ribs formed therein and extending lengthwise of the belt. The V-ribbed belt was a 975 mm long K-type, three-ribbed belt, per RMA standards, having a length of 975 mm, a rib pitch of 3.56 mm, a rib height of 2.9 mm, a belt thickness of 5.3 mm, and a rib angle of 400.

In the compression rubber layer, different rubber layers were used as prepared in accordance with Table 7, below.

TABLE 7

| | Inventive Examples | | | Comparative Examples | | | | | |
|---|---|---|---|---|---|---|---|---|---|
| | 8 | 9 | 10 | 11 | 12 | 13 | 14 | 15 | 16 |
| EPDM | 100 | 100 | 100 | 100 | 100 | 100 | 100 | 100 | 100 |
| Nylon cut yarn | 15 | 15 | 15 | 15 | 15 | 15 | 15 | 15 | 15 |

TABLE 7-continued

|  | Inventive Examples | | | Comparative Examples | | | | | |
| --- | --- | --- | --- | --- | --- | --- | --- | --- | --- |
|  | 8 | 9 | 10 | 11 | 12 | 13 | 14 | 15 | 16 |
| Aramid cut yarn | 5 | 5 | 5 | 5 | 5 | 5 | 5 | 5 | 5 |
| Stearic acid | 1 | 1 | 1 | 1 | 1 | 1 | 1 | 1 | 1 |
| Zinc oxide | 5 | 5 | 5 | 5 | 5 | 5 | 5 | 5 | 5 |
| SAF carbon black | 50 | 50 | 50 | 50 | 50 | 50 | 50 | 50 | 50 |
| Paraffinic oil | 10 | 10 | 10 | 10 | 10 | 10 | 10 | 10 | 10 |
| Antioxidant | 2 | 2 | 2 | 2 | 2 | 2 | 2 | 2 | 2 |
| N,N'-m-phenylene dimaleimide | 2 | 6 | 10 | 0 | 0 | 0 | 0 | 15 | 2 |
| Triallyl Isocyanurate | 0 | 0 | 0 | 0 | 2 | 0 | 0 | 0 | 0 |
| Trimethylolpropane trimethacrylate | 0 | 0 | 0 | 0 | 0 | 2 | 0 | 0 | 0 |
| Peroxide (DPC40) | 8 | 8 | 8 | 8 | 8 | 8 | 0 | 8 | 8 |
| Sulfur | 0.2 | 0.6 | 1 | 0 | 0 | 0.2 | 1.5 | 0 | 1.5 |
| Vulcanization accelerator (MBT) | 0 | 0 | 0 | 0 | 0 | 0 | 1 | 0 | 0 |
| Vulcanization accelerator (TMTD) | 0 | 0 | 0 | 0 | 0 | 0 | 1.5 | 0 | 0 |
| Presence or absence of tack wear | absence | absence | absence | presence | presence | presence | presence | absence | presence |
| Heat-resistant operating lifetime | 355 | 282 | 180 | — | — | — | — | 62 | — |
| Temperature-resistant operating lifetime | 250 | 190 | 120 | — | — | — | — | 24 | — |

The compositions were kneaded in a Banbury mixer and calendered with a calendering roll.

The compression rubber layer had short fibers embedded therein and extending laterally with respect to the belt.

The belts were produced by first applying the two-ply rubber-coated canvas to a flat cylindrical mold. A cushion rubber layer was wrapped around the canvas. The load carrying cords were spirally wound around the cushion rubber layer. A compression rubber layer was then disposed on the cushion rubber layer. The sleeve subassembly thus formed was inserted in a vulcanizing jacket and vulcanized. The vulcanized sleeve was removed from the mold and the compression rubber layer thereon ground to form ribs. The sleeve was then cut into individual belts.

The V-ribbed belts were tested for tack wear and for heat and temperature resistance during operation.

Tack Wear Test

The V-ribbed belts were operated at room temperature using a 120 mm diameter driving pulley, a 120 mm driven pulley, and a 45 mm idler pulley. A horsepower of 12 was applied to the driven pulley, with a load of 85 kgf applied to the idler pulley. The belt was operated by rotating the driving pulley at 4900 rpm for 48 hours. The belts were then checked for the presence or absence of tack wear.

Heat Resistance During Operation

The machine used to test heat resistance had a 120 mm diameter driving pulley and a 120 mm diameter driven pulley. A 45 mm idler pulley and 70 mm tensioning pulley were used. After engaging the belts with the pulleys, the belts were operated at an atmospheric temperature of 120° C. with the driving pulley rotated at 4900 rpm. A horsepower of 12 was applied to the driven pulley with an initial tension of 57 kgf applied to the tensioning pulley. The idler pulley was held in backside interengaged relationship with the belts and was set at a winding angle of approximately 120°. The time was measured at which cracks were developed at the ribbed portion of the belts. Heat resistance performance was compared and evaluated.

Temperature Resistance During Operation

The belts were interengaged with a 120 mm diameter driving pulley and a 45 mm diameter driven pulley. A backside idler pulley having a 75 mm diameter was used. The belts were left for 18 hours at an atmospheric temperature of −40° C. and the driven pulley operated at 700 rpm with a load of 85 kgf applied thereto. The belt was operated for one minute with operation then discontinued for two minutes. This cycle was repeated and the time determined at which cracking occurred for each belt.

As can be seen in Table 7, the inventive belts having ribs formed from ethylene-propylene rubber composition were freer of tack wear compared to conventional belts. The inventive belts had a longer lifetime in both high and low temperature atmospheres, i.e. they were better in terms of heat and temperature resistance compared to chloroprene rubber belts.

COMPARATIVE EXAMPLE 17

A CR rubber formulation is shown in Table 8 kneaded with a Banbury mixer and calendered with a calendering roll.

TABLE 8

|  | Comparative Example 17 |
| --- | --- |
| Chloroprene | 100 |
| Nylon cut yarn | 15 |
| Carbon black | 40 |
| Plasticizer (DOP) | 10 |
| Stearic acid | 1 |
| Octylated diphenylamine | 2 |
| Magnesium oxide | 4 |
| Zinc oxide | 5 |
| Vulcanization accelerator (ETU) | 0.5 |
| Presence or absence of tack wear | Absence |
| Heat-resistant operating lifetime (hrs) | 70 |
| Temperature-resistant operating lifetime (hrs) |  |

Short fibers were incorporated into the compression rubber layer and oriented laterally with respect to the belt. For the cushion rubber layer, the same rubber formulation as used in the compression rubber layer was used except that there were no short reinforcing nylon or aramid fibers therein.

The V-ribbed belts were then tested for tack wear, heat resistance and temperature resistance during operation, with the results indicated in Table 8.

The CR rubber belt, while essentially free of tack wear, was inferior in heat and temperature resistance to belts made according to the invention.

The foregoing disclosure of specific embodiments is intended to be illustrative of the broad concepts comprehended by the invention.

What is claimed is:

1. A power transmission belt comprising:
   a body comprising rubber comprising an ethylene-α-olefin elastomer and N,N'-m-phenylene dimaleimide added in an amount of 0.2–10 parts by weight per 100 parts by weight of ethylene-α-olefin elastomer.

2. The power transmission belt according to claim 1 wherein the rubber is vulcanizable with a peroxide.

3. The power transmission belt according to claim 1 wherein the rubber further comprises sulfur in an amount of 0.01–1.0 parts by weight per 100 parts by weight of ethylene-α-olefin elastomer.

4. The power transmission belt according to claim 2 wherein the rubber further comprises sulfur in an amount of 0.01–1.0 parts by weight per 100 parts by weight of ethylene-α-olefin elastomer.

5. The power transmission belt according to claim 1 wherein the body comprises a cushion rubber layer with load carrying cords embedded therein and a second rubber layer and at least the second layer comprises rubber comprising an ethylene-α-olefin elastomer and N,N'-m-phenylene dimaleimide added in an amount of 0.2–10 parts by weight per 100 parts by weight of ethylene-α-olefin elastomer.

6. The power transmission belt according to claim 5 wherein the body comprises at least one rib and the rib is formed in the second layer.

7. The power transmission belt according to claim 5 wherein the body as a compression section and a tension section and the second layer defines at least a part of the compression section.

8. The power transmission belt according to claim 5 wherein the power transmission belt is a V-ribbed belt.

9. The power transmission belt according to claim 8 wherein the rubber further comprises sulfur in an amount of 0.01–1.0 parts by weight per 100 parts by weight of ethylene-α-olefin elastomer.

10. The power transmission belt according to claim 2 further comprising a covering canvas layer on the body.

11. The power transmission belt according to claim 10 wherein the covering canvas layer is treated with resorcin-formalin-latex.

12. The power transmission belt according to claim 11 wherein the rubber further comprises sulfur in an amount of 0.01–1.0 parts by weight per 100 parts by weight of ethylene-α-olefin elastomer.

13. The powertransmission belt according to claim 10 wherein the body comprises a cushion rubber layer with load carrying cords embedded therein and the cushion rubber layer comprises a vulcanizate derivable by vulcanizing an ethylene-α-olefin elastomer with sulfur.

14. The power transmission belt according to claim 11 wherein the body comprises a cushion rubber layer with load carrying cords embedded therein and the cushion rubber layer comprises a vulcanizate derivable by vulcanizing an ethylene-α-olefin elastomer with sulfur.

15. The power transmission belt according to claim 12 wherein the body comprises a cushion rubber layer with load carrying cords embedded therein and the cushion rubber layer comprises a vulcanizate derivable by vulcanizing an ethylene-α-olefin elastomer with sulfur.

16. The powertransmission belt according to claim 12 wherein the body comprises at least one rib.

17. The power transmission belt according to claim 12 wherein the body comprises a plurality of ribs.

18. The power transmission belt according to claim 13 wherein the body comprises at least one rib.

19. The powertransmission belt according to claim 13 wherein the body comprises a plurality of ribs.

20. A rubber composition comprising:
    an ethylene-α-olefin elastomer and N,N'-m-phenylene dimaleimide added in an amount of 0.2–10 parts by weight per 100 pats by weight of ethylene-α-olefin elastomer.

21. The rubber composition of claim 20 wherein the rubber composition is vulcanizable with a peroxide.

22. The rubber composition of claim 20 wherein the rubber composition further comprises sulfur in an amount of 0.01–1.0 parts by weight per 100 parts by weight of ethylene-α-olefin elastomer.

23. A power transmission belt comprising:
    a body comprising a cushion rubber layer with load carrying cords embedded therein, and a second rubber layer, and
    a covering canvas layer applied to the body,
    the cushion rubber layer comprising a vulcanizate derivable by vulcanizing an ethylene-α-olefin elastomer with sulfur,
    the second layer comprising a vulcanizate derivable by vulcanizing an ethylene-α-olefin elastomer with an organic peroxide,
    the covering canvas layer treated with resorcin-formalin-latex.

24. The power transmission belt according to claim 23 wherein the body comprises at least one rib.

25. The powertransmission belt according to claim 23 wherein the body comprises a plurality of ribs.

* * * * *